J. H. GIBSON,

Assignor, by mesne assignments, to H. W. WARNER and J. H. SANDERSON.

CARRIAGE TOP.

No. 9,829. Reissued Aug. 9, 1881.

Attest.

Sidney P. Hollingsworth.

Robt. L. Miller

Inventor.

J. H. Gibson.

Assignor to

H. W. Warner and

J. H. Sanderson.

By P. T. Dodge Atty.

N. PETERS, Photo-Lithographer, Washington, D. C.

UNITED STATES PATENT OFFICE.

JACOB H. GIBSON, OF KINGSLAND, NEW JERSEY, ASSIGNOR, BY MESNE ASSIGNMENTS, TO HENRY W. WARNER AND JOHN H. SANDERSON, BOTH OF GREENFIELD, MASSACHUSETTS.

CARRIAGE-TOP.

SPECIFICATION forming part of Reissued Letters Patent No. 9,829, dated August 9, 1881.

Original No. 163,178, dated May 11, 1875. Application for reissue filed June 4, 1881.

*To all whom it may concern:*

Be it known that I, J. H. GIBSON, of Kingsland, in the county of Bergen and State of New Jersey, have invented certain new and useful Improvements in Carriage-Tops; and I do hereby declare the following is a full, clear, and exact description of the invention, that will enable others skilled in the art to which it appertains to make and use the same, reference being had to the accompanying drawings, and to the letters of reference marked thereon, which form a part of this specification.

My invention relates to an adjustable canopy for carriages, its object being to support the canopy in such manner that it may be readily adjusted to any desired angle to shield the occupant of the carriage from the rays of the sun; and to this end the invention consists in mounting the canopy on and above the curved upper end of a standard or support in such manner that it may be moved thereon to change its inclination; in a set-screw and slide secured to the canopy on its under side and mounted on the curved end of the support; in swiveling or hinging the upper end of the support or standard, and in other details hereinafter specified.

Figure 1:
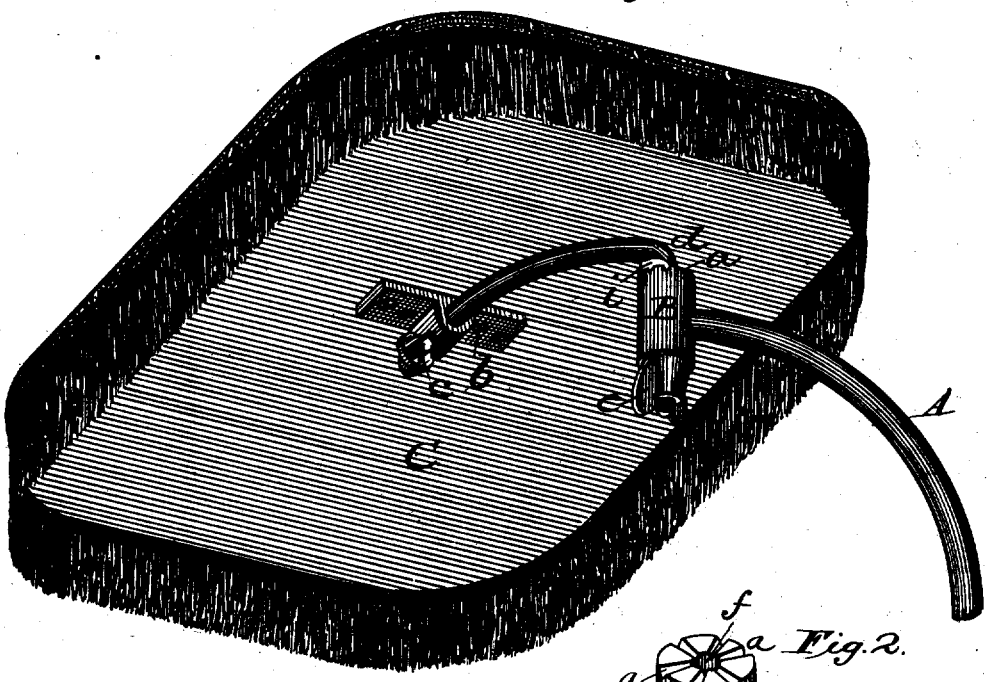
Figure 2:
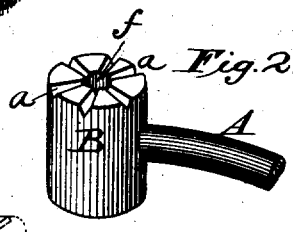
Figure 3:
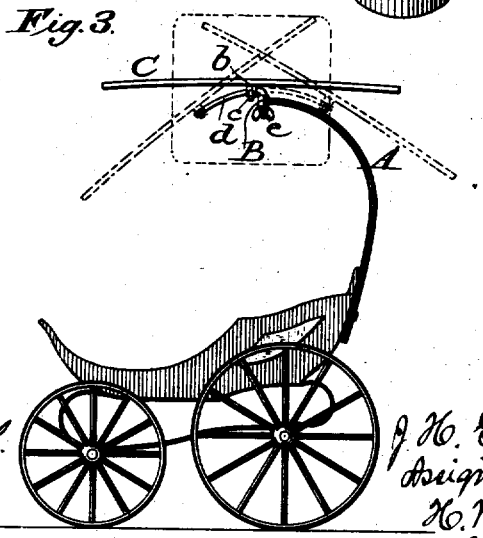

Figure 1 is a perspective view of my improved devices. Fig. 2 is a perspective view of the socket to hold the upper curved end of the standard. Fig. 3 is a side elevation of a carriage having my canopy thereon.

In the drawings, A represents a support or standard, of any desired form, attached to the carriage, preferably at the back, with its upper end overhanging the carriage-body, as shown. At the upper end of this support it is provided with a socket, B, having a hole, *f*, therein. Into this hole is inserted the downwardly-turned and threaded end of the bar *d*. This threaded end of the bar is at nearly a right angle to the body of the bar, and is provided at the lower end, below the socket, with a thumb-nut, *c*, by which to fasten it rigidly in position. The bar or arm can be turned or swung around horizontally in the socket, and in place of the thumb-nut, for securing it in position, the socket may be provided with a series of recesses, *a*, and the bar made of corresponding form, as shown at *i*, to enter them. The body of the bar or arm *d* forms, when fastened in position, a continuation of the standard A, and when so fastened in any position it has the same action and effect as if formed solidly upon and as a part of the standard. The arm or bar is curved, and its end inclined downward, as shown in Figs. 1 and 3. Upon this curved bar or arm is arranged to slide the piece *b*, secured to the inside or under side of the canopy C, and provided with a thumb-screw, *c*, by which it is fastened in position on the arm.

By loosening the thumb-screw *c* the canopy may be released, and then moved endwise upon the bar or arm *d*, and fastened in any desired position. Owing to the curvature of the bar or arm, the movement of the canopy lengthwise thereon causes the canopy to assume a horizontal position or a greater or less inclination according to the point at which it is secured.

The operation of the device in the form shown is as follows: At about midday, when the sun is high, the curved bar or arm *d* may be fixed by the set-screw *e* in a position extending lengthwise of the carriage, as shown in Fig. 3, and the slide *b* attached to the canopy moved back nearly or quite to the socket, until the canopy is in a nearly horizontal position, and then fastened by tightening the screw. When, earlier or later in the day, the sun is lower the slide *b* is moved toward the end of the arm, and the canopy thereby tipped or turned down from the horizontal position to a great or less extent, as desired. If the sun is in front of the carriage, the arm or bar *d* remains in the position shown in Figs. 1 and 3, permitting the canopy to be thrown down in front of the carriage, as shown in Fig. 1 and indicated by dotted lines in Fig. 3. If the sun is in rear of the carriage, the arm or bar *d* may be turned backward, as indicated by the dotted lines in Fig. 3. Whenever the canopy is moved to the desired position toward the end of the bar *d* it is secured by the set-screw *c*.

It is evident that the socket and its pivot may be reversed without departing in the least from the invention—that is to say, the socket may be made upon the curved bar *d* and the end of the support A bent upward to form the pivot, the socket then fitting down upon the pivot and the arm *d* being allowed to swing around upon its pivot, as before.

From the description hereinbefore given it will be seen that my canopy is given the greatest scope in its movements, so as to give a perfect and entire protection from the sun, and that when not required for use it may be quickly and easily detached, either by removing the pivot from the socket or by removing the support A from the carriage.

I do not claim to be the first to attach a canopy movably to a standard or arm overhanging a carriage. Nor do I claim to be the first to sustain a canopy movably or adjustably upon an overhanging standard.

I am aware that carriage-tops have hitherto been constructed in which a canopy has been suspended by a fixed ball-and-socket joint beneath the standard, and also that a canopy has been attached by a sliding connection to the inside of an overhanging arm, the construction and arrangement being such, however, that the top could receive only a limited adjustment forward and backward, and that it could not be turned down behind the body because of its edge coming in contact with the standard; also, that a canopy has been hinged or pivoted upon a transverse arch or frame to rock forward and backward, the canopy in such case being incapable of adjustment forward and backward, except as it swings around the fixed pivot.

My device, however, differs from all others which precede it in two important particulars among others—first, in that the sustaining arm or bar on which my canopy is mounted is given a marked curvature, so that the longitudinal adjustment of the canopy causes its inclination to increase or diminish to a wide extent; and, second, that my canopy is mounted above instead of below the sustaining-arm, whereby it is permitted to swing or tip forward and backward through a wide range, at the same time sliding forward and backward, whereby the inclined adjustment is secured without interference from the standard, and without causing the canopy to strike the occupant of the carriage.

I am aware that a standard having a curved top has been united by a vertical pivot to a straight horizontal rod, which latter was provided with a sliding clamp sustaining the vertical stem or handle of an umbrella, the arrangement being such as to permit a vertical and lateral motion of the umbrella, but maintain its handle in the vertical position.

Having thus described my invention, what I claim is—

1. In combination with a standard or arm having a curved overhanging upper end, a canopy mounted upon and above said curved end, and adjustable lengthwise thereon, substantially as described and shown.

2. A carriage top or canopy provided with a clamping device on its under side, in combination with a supporting arm or standard having an upper overhanging end inserted through the clamp, and adjustable endwise therein, whereby the top is permitted to pass backward over the standard without striking the same.

3. The combination of a carriage-body, a standard fixed to the carriage and overhanging the body, and having at its upper end a downward curvature, and a canopy secured to and longitudinally adjustable upon said curved end, the parts being constructed as shown, so that the canopy may be turned down in front of the body by its forward adjustment.

4. The combination of the standard, the curved laterally-swinging arm or end *d*, and the canopy mounted on said end.

5. The combination of the standard A, the arm *d*, pivoted thereon, the devices for securing said arm, and the top mounted upon and above the arm, and secured thereto by an adjustable clamping device.

6. In combination with an overhanging arm having a vertical curvature, a carriage top or canopy mounted upon and above said arm and adjustable longitudinally thereon.

In testimony whereof I affix my signature in presence of two witnesses.

JACOB H. GIBSON.

Witnesses:
GEORGE McKEE,
H. P. WEST.